United States Patent
Ling

(10) Patent No.: US 9,693,198 B2
(45) Date of Patent: *Jun. 27, 2017

(54) METHOD AND SYSTEM FOR LOCATION DETERMINATION AND NAVIGATION USING TEXTUAL INFORMATION

(71) Applicant: Maxlinear, Inc., Carlsbad, CA (US)

(72) Inventor: Curtis Ling, Carlsbad, CA (US)

(73) Assignee: Maxlinear, Incorporated, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,494

(22) Filed: Feb. 1, 2016

(65) Prior Publication Data

US 2016/0150377 A1    May 26, 2016

Related U.S. Application Data

(63) Continuation of application No. 13/328,413, filed on Dec. 16, 2011, now Pat. No. 9,253,607.

(51) Int. Cl.
  *H04W 24/00* (2009.01)
  *H04W 4/02* (2009.01)
  (Continued)

(52) U.S. Cl.
  CPC ...... *H04W 4/026* (2013.01); *G06F 17/30312* (2013.01); *G06K 9/18* (2013.01);
  (Continued)

(58) Field of Classification Search
  CPC .......... B65H 2511/20; B65H 2511/413; B65H 2701/1241; G06K 9/0063; G06K 9/228; H04M 1/72569; H04M 1/7253; H04M 1/72536; H04M 1/72572; H04M 1/2755; H04N 5/23293; H04N 2201/3253; H04N 1/00307
  USPC ... 455/456.1, 456.6, 556.1, 456.3, 418, 457, 455/550.1, 13.1, 404.2, 41.2, 420; 348/116, 207.1; 340/5.83, 5.53, 995.19, 340/995.28

See application file for complete search history.

(56) References Cited

U.S. PATENT DOCUMENTS 8,131,118 B1    3/2012  Jing et al.
8,509,488 B1    8/2013  Enge et al.
(Continued)

*Primary Examiner* — Fred Casca
(74) *Attorney, Agent, or Firm* — McAndrews, Held & Malloy

(57) ABSTRACT

Methods and systems for location determination and navigation using textual information may comprise in a wireless communication device: capturing one or more images of one or more sources of textual information in the vicinity of the wireless communication device, extracting text from the one or more sources of textual information, and determining a position of the wireless communication device by, at least in part, determining a distance to a letter at a beginning of the one or more sources of textual information, determining a distance to a letter at an end of the one or more sources of textual information, and triangulating the position using the determined distances. An orientation of the text in the captured one or more images may be sensed relative to the wireless device. An orientation of the wireless device may be utilized in conjunction with the extracted text for the position determining.

23 Claims, 14 Drawing Sheets

(51) Int. Cl.
  *H04W 64/00* (2009.01)
  *H04W 4/04* (2009.01)
  *G06F 17/30* (2006.01)
  *G06K 9/18* (2006.01)
  *G06T 7/70* (2017.01)

(52) U.S. Cl.
  CPC ............... *G06T 7/70* (2017.01); *H04W 4/02* (2013.01); *H04W 4/023* (2013.01); *H04W 4/043* (2013.01); *H04W 64/00* (2013.01)

(56) References Cited

U.S. PATENT DOCUMENTS

| | | | |
|---|---|---|---|
| 2010/0092034 A1 | 4/2010 | Arnaud et al. | |
| 2011/0064312 A1 | 3/2011 | Janky et al. | |
| 2013/0045751 A1* | 2/2013 | Chao | G01C 21/206 455/456.1 |
| 2013/0045754 A1 | 2/2013 | Markhovsky et al. | |

* cited by examiner

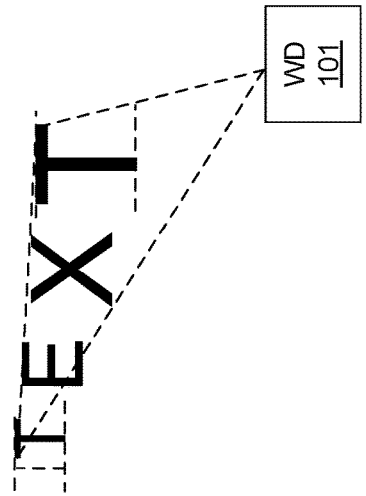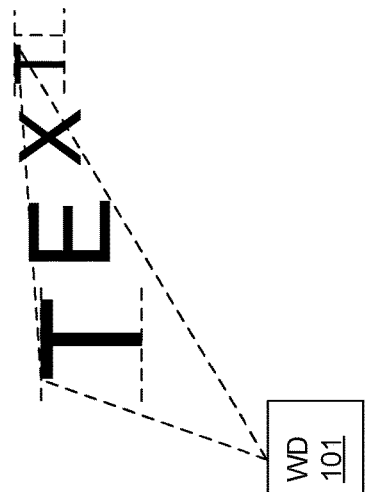
FIG. 9A
FIG. 9B
FIG. 9C
FIG. 9

METHOD AND SYSTEM FOR LOCATION DETERMINATION AND NAVIGATION USING TEXTUAL INFORMATION

CROSS-REFERENCE TO RELATED APPLICATIONS/INCORPORATION BY REFERENCE

This application is a continuation of Application Ser. No. 13/328,413 filed on Dec. 16, 2011, which is hereby incorporated herein by reference in its entirety.

FIELD OF THE INVENTION

Certain embodiments of the invention relate to wireless device positioning. More specifically, certain embodiments of the invention relate to a method and system for location determination and navigation using textual information.

BACKGROUND OF THE INVENTION

Wireless communication devices with global location navigation system (GNSS) capability are becoming more prevalent. These devices depend on RF signals received from satellites for calculating position. However, these satellite signals are weak and are attenuated when inside buildings such that wireless devices can no longer obtain a lock on the signals and thus can no longer determine location.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for location determination and navigation using textual information, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 9A-9C is a diagram illustrating an exemplary wireless device positioning based on text perspective, in accordance with an embodiment of the invention.

DETAILED DESCRIPTION OF THE INVENTION

Certain aspects of the invention may be found in a method and system for location determination and navigation using textual information. Exemplary aspects of the invention may comprise capturing one or more images of one or more sources of textual information in the vicinity of the wireless communication device. Text may be extracted from the one or more sources of textual information, and a position of the wireless device may be determined based on a comparison of the extracted text in the captured one or more images to text in a stored database of textual information. An orientation of the text may be sensed in the captured one or more images relative to the wireless device. An orientation of the wireless device may be utilized in conjunction with the extracted text for the position determining. The orientation and the extracted text may be utilized in conjunction with determined distances from the one or more sources of textual information for the position determining. Locations of the sources of textual information and/or the captured one or more images may be stored in the database of textual information. An instruction to capture one or more images in a different orientation may be received when the positioning does not meet an accuracy requirement. The database of textual information may be downloaded when GNSS signals sufficient for positioning are no longer received by the wireless communication device. A distance from one or more of the sources of textual information in the vicinity of the wireless communication device may be determined based on known optical properties of a camera in the wireless communication device. The optical properties may comprise focal length and/or and focus setting. The determined distance may be used to determine an accurate location based on the captured one or more images.

Figure 1:
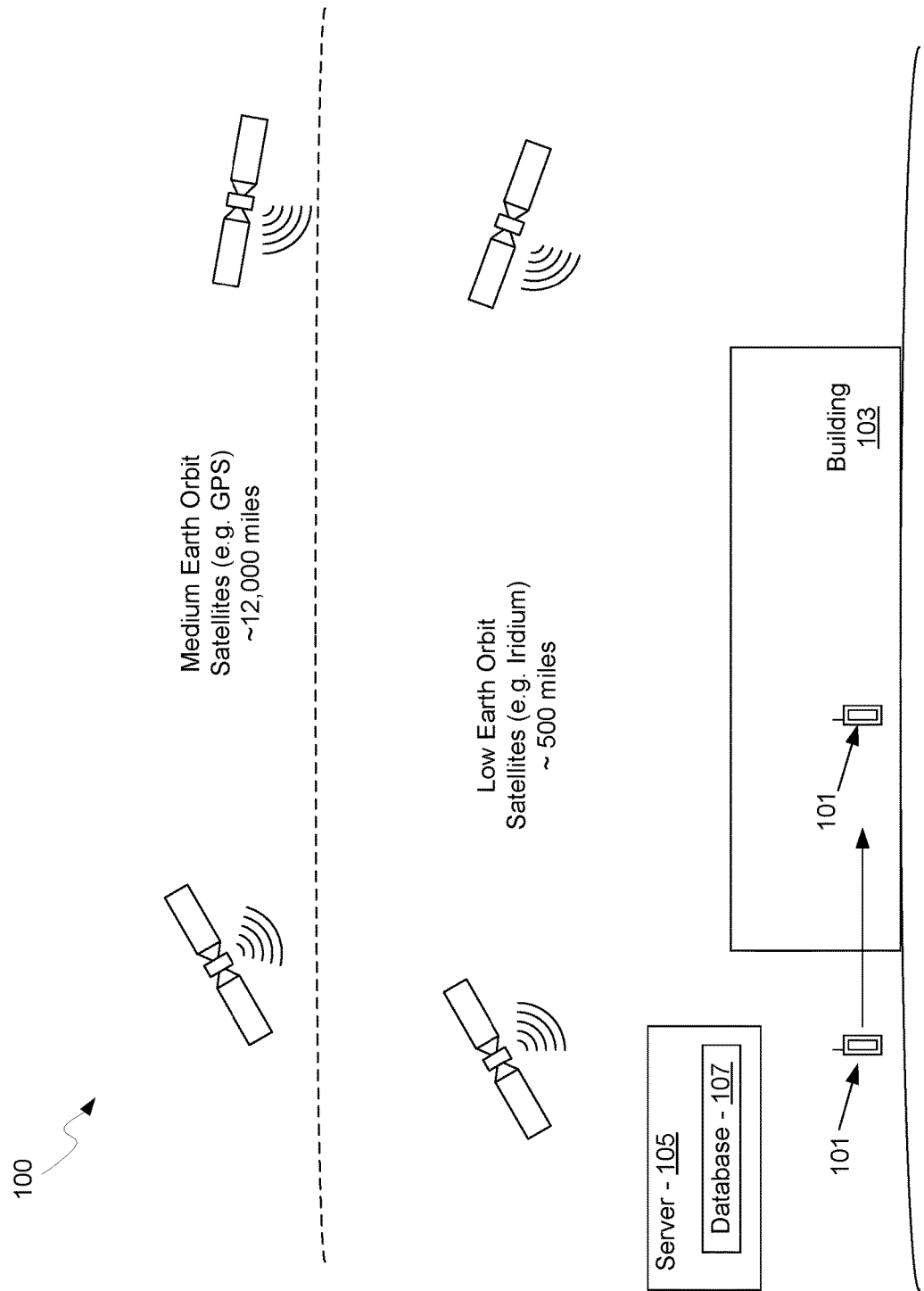
FIG. 1 is a block diagram of an exemplary wireless device with positioning capability, in accordance with an embodiment of the invention.

FIG. 1 is a diagram of an exemplary wireless device with positioning capability, in accordance with an embodiment of the invention. Referring to FIG. 1, there is shown a wireless device 101 and the server 105, which may comprise a database 107. The wireless device 101 may comprise any device (e.g. smart phone) or vehicle where its user may desire to know the location of such device or vehicle. The wireless device 101 may comprise a global navigation satellite system (GNSS) receiver that may be operable to receive medium Earth orbit (MEO) satellite signals and low Earth orbit (LEO) satellite signals.

There is also shown MEO satellites (e.g. GPS satellites), and LEO satellites (e.g. Iridium communication satellites). Medium Earth orbit satellites may be at a height of about 12,000 miles above the surface of the Earth, compared to about 500 miles above the surface for low Earth orbit satellites. Therefore, the signal strength of LEO satellite signals is much stronger than MEO satellite signals. LEO satellites may be used for telecommunication systems, such as satellite phones, whereas MEO satellite systems may be utilized for location and navigation applications.

In certain circumstances, satellite signals may be attenuated when the wireless device 101 enters a building, such that the wireless device may not be able to utilize satellite signals to determine its location. In this instance, it may be desirable to determine the location of the wireless device 101 utilizing other techniques.

In an exemplary embodiment, the wireless device 101 may determine its location via GNSS when outside the building 103. In instances where the building 103 attenuates satellite signals to such a level that the wireless device 101 can no longer obtain a lock for GNSS positioning purposes, the wireless device 101 may utilize textual information to determine its location.

Textual information may be input to the wireless device 101 via a photo, a series of photos, or video taken by a camera in the wireless device 101. These may be combined with orientation (elevation, azimuth, and rotation) of the camera captured by a compass, gyroscope, gravity sensor, or other kind of sensor present in the camera. Optical focus and/or distance sensors on the camera may estimate the distance of the wireless device 101 to the textual information. Furthermore, the camera in the wireless device may comprise an auto-detect function for text, such as optical character recognition, and may automatically perform an auto-zoom into text characters to improve recognition and positioning. The accuracy of the character recognition may be improved by making the text a larger portion of the captured image, increasing the ability to detect fonts, colors, or other features or characteristics of the text.

The textual information may include the position and orientation of the letters in three dimensions, the direction of the text, the absolute size of the letters, the fonts used, the language, slang, dialect or patois in the text, the color and/or lighting of the text, defects, blemishes, and the presence of bar codes nearby, for example. Similarly, other marks, such as trademarks or any graphical feature usually associated with particular text, for example, may be considered in conjunction with the actual text captured to assist in determining the position. Furthermore, the context of the text may be utilized to assist in the correlation. For example, if the text is taken from a store sign (inferred from being present in a shopping mall and looking upward) this knowledge may be utilized to narrow the database search to store names. Similarly, if the text is from a billboard or from a sign giving directions to pedestrians, a different subset of the database may be searched. The textual information in images, their relative position to each other and distance from the camera, obtained by the wireless device 101 may be compared to the known textual information of the building in one or more database, such as the database 107, either stored locally or obtained from a remote server 105. The server may be accessed via a cellular network or the Internet via an access point, for example.

In an exemplary scenario, the wireless device 101 may download a textual information map of the building 103 upon entering and losing GNSS signals; it may download the textual features of the building; or it may use satellite information and publically-available maps to estimate the locations of text related to known stores or other facilities in the building. For example, a map of a shopping center may comprise the location of stores in the facility, such that a captured image of a store's name of the appropriate size for the sign in front of the store may be utilized to accurately determine the position of the wireless device 101.

In another exemplary scenario, the wireless device 101 may store textual information maps of buildings commonly visited by the user of the device 101. In yet another exemplary scenario, the wireless device 101 may download textual information maps of locations that the user of the wireless device enters or plans to enter in the future. For example, if a user has entered an address of a shopping mall or a sports arena into a navigation program, the wireless device may download one or more textual information maps associated with the destination or destinations. Similarly, if a calendar for the user has an entry for a sports event at a particular sports arena, the wireless device 101 may download textual information maps for that sports arena, including seating sections, for example, prior to the event. Or if a user has a flight scheduled, the wireless device 101 may download textual information maps, including terminal and gate numbers and/or airline names, for the airports to be utilized on the trip.

The wireless device 101 may determine its position by using estimated orientation and (when available) distance relative to textual elements, and employing triangulation methods such as is done in orienteering using the azimuth reading (e.g. provided by a compass) of several textual reference points to pinpoint one's location on a map. It may use more sophisticated trilateration calculations such as is done by GNSS devices, once distance to textual elements is estimated. The orientation of the captured text with respect to the wireless device 101 may be determined based on the orientation of the wireless device 101 in space as measured using internal sensors such as a compass and MEMS accelerometers, for example.

The wireless device 101 may compare one or more captured textual elements, such as store signs, for example, to textual elements in stored or retrieved databases, and known to be in the vicinity of the wireless device when it lost GNSS lock upon entering the building 103. By comparing a captured word, phrase, or character to a known textual element, and finding a match, or a correlation above a threshold level, the wireless device may then calculate its location based on the known map of the building 103. This is shown in further detail in FIG. 2A-2D.

Figure 2A:
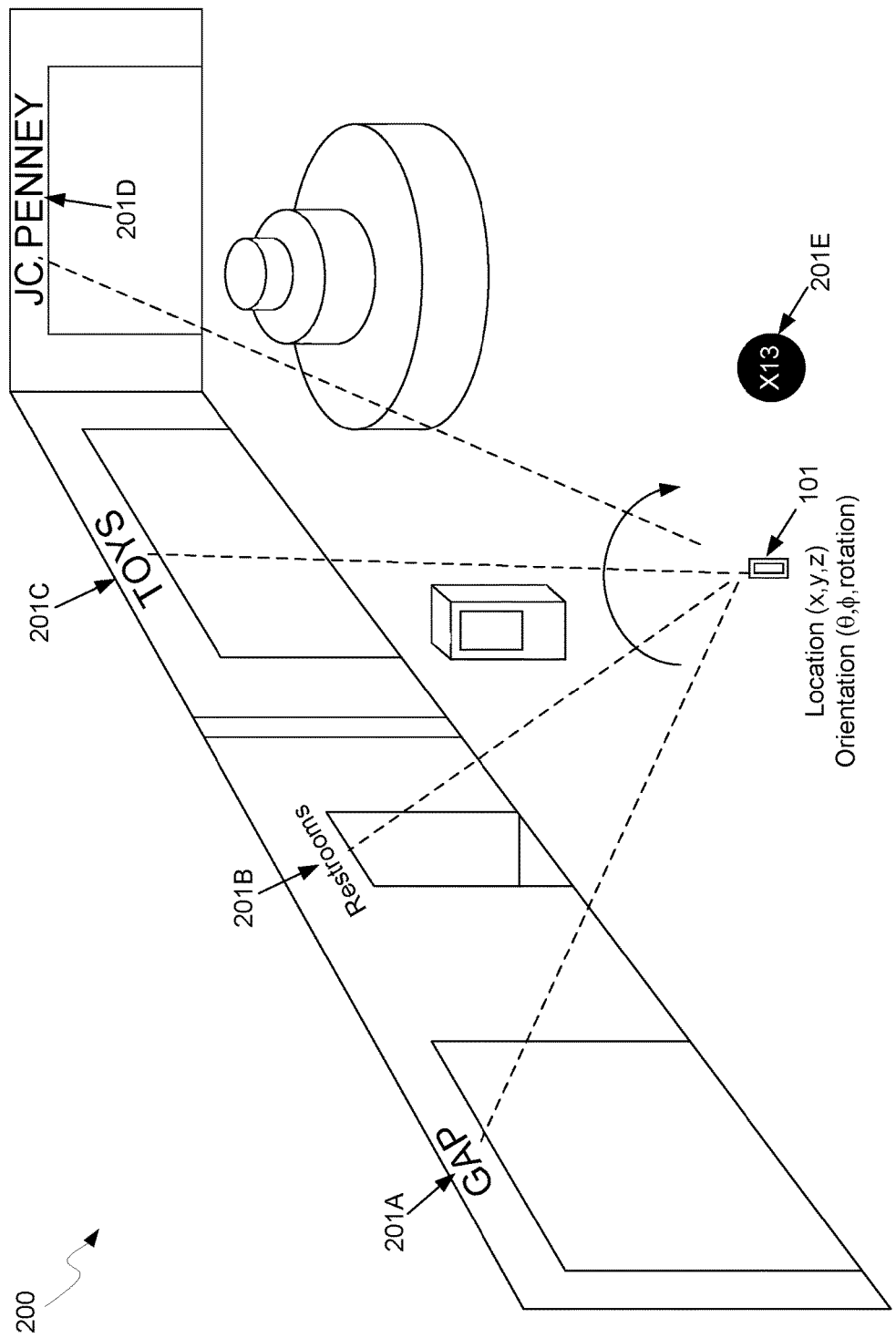
FIG. 2A is a block diagram illustrating an exemplary building with textual information, in accordance with an embodiment of the invention.

FIG. 2A is a block diagram illustrating an exemplary building with textual information, in accordance with an embodiment of the invention. Referring to FIG. 2A, there is shown a shopping mall 200 comprising stores and hallways with textual signs 201A-201E. There is also shown the wireless device 101, which may be located at location (x,y,z) and at an orientation (Θ, φ, rotation), and may be operable to determine its location based on a comparison of textual information obtained from images captured by a camera in the wireless device 101 and known textual information in a pre-stored or retrieved database.

The wireless device 101 may be operable to download a map, or textual information database, comprising visible examples of text in the shopping mall 200 when the device enters the facility and loses satellite positioning signals. In another exemplary scenario, the wireless device 101 may download a textual information database when the user of the wireless device 101 activates a positioning function on the device and no satellite positioning signals are present. In yet another exemplary scenario, the wireless device 101 may have textual information maps stored internally for various buildings frequented by the user, or automatically downloaded whenever in the vicinity of a structure that attenuates satellite positioning signals.

In an exemplary scenario, once inside the shopping mall 200, the wireless device 101 may capture one or more images, or video, of the textual information visible in the shopping mall 200. For example, the wireless device 101 may be used to scan from left to right, as illustrated by the curved arrow in FIG. 2A, capturing an image comprising the signs 201A-201E. The captured image or images and their orientation to textual elements may be compared to the known signs or other textual information in the shopping mall 200 from a pre-stored or downloaded textual information database. Similarly, the database may comprise a map of the stores, entrances, restrooms, and other features of the shopping mall 200 such that captured text that matches these elements may indicate a position of the wireless device 101.

The database may comprise basic elements such as the simple text itself of various recognizable features of the shopping mall 200, such as stores, restrooms, and exits. Similarly, the database may comprise the 3D location of the textual elements; images or abstractions of the image of signs to allow for easy identification from any orientation relative to the element (including characteristics such as color, size, font, language, dialect, and patois of the text). Given images containing several possible textual elements, and given the orientation and distance of the textual elements, the wireless device 101 may find in the database the most likely textual elements that correspond to those in the images. Alternatively, the wireless device may utilize optical character recognition to determine the text captured in the image and compare directly to text stored in the database that is known to be within the shopping mall 200. Text extraction from captured images may be performed by the wireless device 101 and/or by the system comprising the database.

The wireless device 101 may then compare the captured image to a database comprising the known text. For example, a processor in the wireless device 101 may determine a coarse location by determining that the text "GAP" from the image corresponds to the location of the Gap store, particularly since it is adjacent to the "Restrooms" text, which is known to be adjacent to the Gap in the database. In addition, given the known optical properties of the camera in the wireless device, e.g., focal length and zoom, and the size of the GAP text in the sign as stored in the database, the wireless device 101 may thus calculate its distance from the Gap store.

In another exemplary scenario, the sign 201E may comprise a circular or other shaped spot or location on the floor of the shopping mall 200 with a textual identifier and a known position in the database. Accordingly, a user may capture an image of the sign 201 E while standing above it and then determine an accurate location from the database. Similarly, the wireless device 101 may capture one or more images of signs or other text in the vicinity while standing atop the spot or location. In this manner, by comparing the captured text with text in the database in conjunction with the known position of the spot or location, the wireless device 101 may determine an accurate position and then be utilized to navigate through the shopping mall 200. Similar spots or locations (with or without identifying signs) with known locations may be placed throughout the shopping center 200 to assist in accurate positioning.

In an exemplary scenario, the wireless device 101 may then display a map for the user to navigate to a desired location, such as an emergency exit, handicap-accessible restroom, or other desired location in the shopping mall 200, for example. The wireless device 101 may then calculate its location on a constant or periodic basis, assuming the camera continues to take images as the user travels throughout the shopping mall 200. It should be noted that the invention is not limited to location determination in a shopping mall, but may be utilized in any location where GNSS positioning is not available and a database of known textual characteristics is available. For example, this may include sports arenas, train stations, airports, hospitals, or office buildings. Using the time elapsed between images, together with the estimated distances from signs or other text, velocity (speed and direction) can be estimated, thereby providing another input to the inertial guidance system in the wireless device 101, which may comprise a compass and inertial sensors, for example.

Similarly, the wireless device 101 may utilize textual or structural elements for positioning purposes to supplement any positioning technology such as GPS, assisted-GPS, WiFi triangulation, inertial sensors/accelerometers, or a hybrid positioning technique comprising two or more of such techniques.

In another exemplary scenario, the wireless device 101 may be operable to capture images of structural elements in the shopping center 220 and determine its location based on the known structures in the stored database. Use of captured images of structures for positioning and navigation is described further in related application U.S. patent application Ser. No. 13/309,081 filed on Dec. 1, 2011, which is herein incorporated by reference.

Figure 2B:
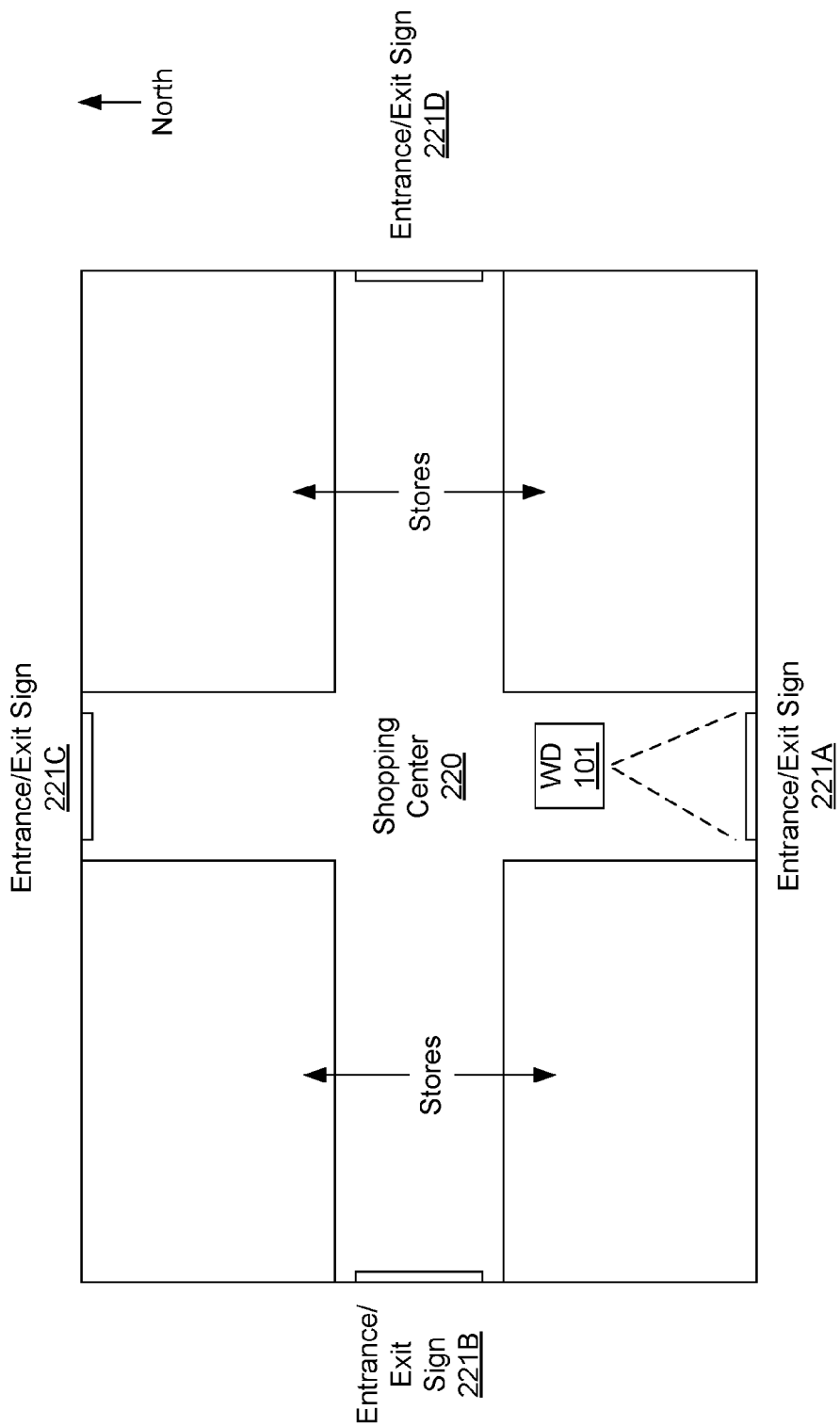
FIG. 2B is a diagram illustrating an exemplary wireless device positioning performed inside a structure based on signs at entrances to the structure, in accordance with an embodiment of the invention.

FIG. 2B is a diagram illustrating an exemplary wireless device positioning performed inside a structure based on signs at entrances to the structure, in accordance with an embodiment of the invention. Referring to FIG. 2B, there is shown a shopping center 220 with various stores, the wireless device 101, and entrance/exit signs 221A-221D.

In an exemplary scenario, the wireless device 101 may be operable to determine its position inside the shopping center 220 by determining the GNSS location of the device at a particular entrance, such as outside the entrance labeled with the entrance/exit sign 221A, for example. In other words, the device knows that it has entered the shopping center 220 at that entrance, since, for example, the textual information database for the shopping center 220 includes GNSS positions for each entrance to the building. This will enable the wireless device 101 to obtain an initial position for navigation within the shopping center 220 without the use of GNSS, in accordance with the textual information database for the shopping center 220, as described herein.

In another exemplary scenario, the wireless device 101 may be operable to determine its initial position within the shopping center 220 without GNSS. The wireless device may have lost GNSS reception when it entered the shopping center 220, or may have had GNSS recently switched off or disabled, for example.

The wireless device 101 may be operable to determine its location through the identification of signs posted at the nearest entrance. For example, the wireless device 101 may comprise a compass such that it can determine what direction the wireless device 101 is facing when capturing an image of an entrance/exit sign, such as the entrance/exit sign 221A. The locations and directional facings of the entrance/exit signs 221A-221D of the shopping center 220 may be known, i.e., stored in a textual information database. Thus, initial position can be determined by comparison of the text from the captured image of the entrance/exit sign with the direction of the device 101 when the image was captured, with the corresponding information stored in the textual information database (i.e., with textual information representative of each entrance such as "South Entrance", and what direction each entrance sign is facing). In the non-limiting example shown in FIG. 2B, since the database indicates that the shopping center 220 comprises a single south facing entrance (i.e. labeled with entrance/exit sign 221A), the wireless device 101 may then determine its position by calculating a distance from the entrance/exit sign 221A using the captured image. In addition, if more than one entrance were to be located to the south, the textual information in the sign in the captured image may be utilized to narrow the location down to be near one particular entrance.

In another exemplary scenario, there may not yet be a fully developed textual information database for the shopping center 220. The wireless device may thus be utilized to input data to a database for the shopping center 220. For example, the wireless device 101 may have established its position before entering the shopping center 220 and then acquired images and/or video of signs and other textual information once inside. Similarly, the wireless device 101 may obtain spatial data in conjunction with captured images and/or video utilizing a pedometer and an altimeter (if necessary).

Figure 2C:
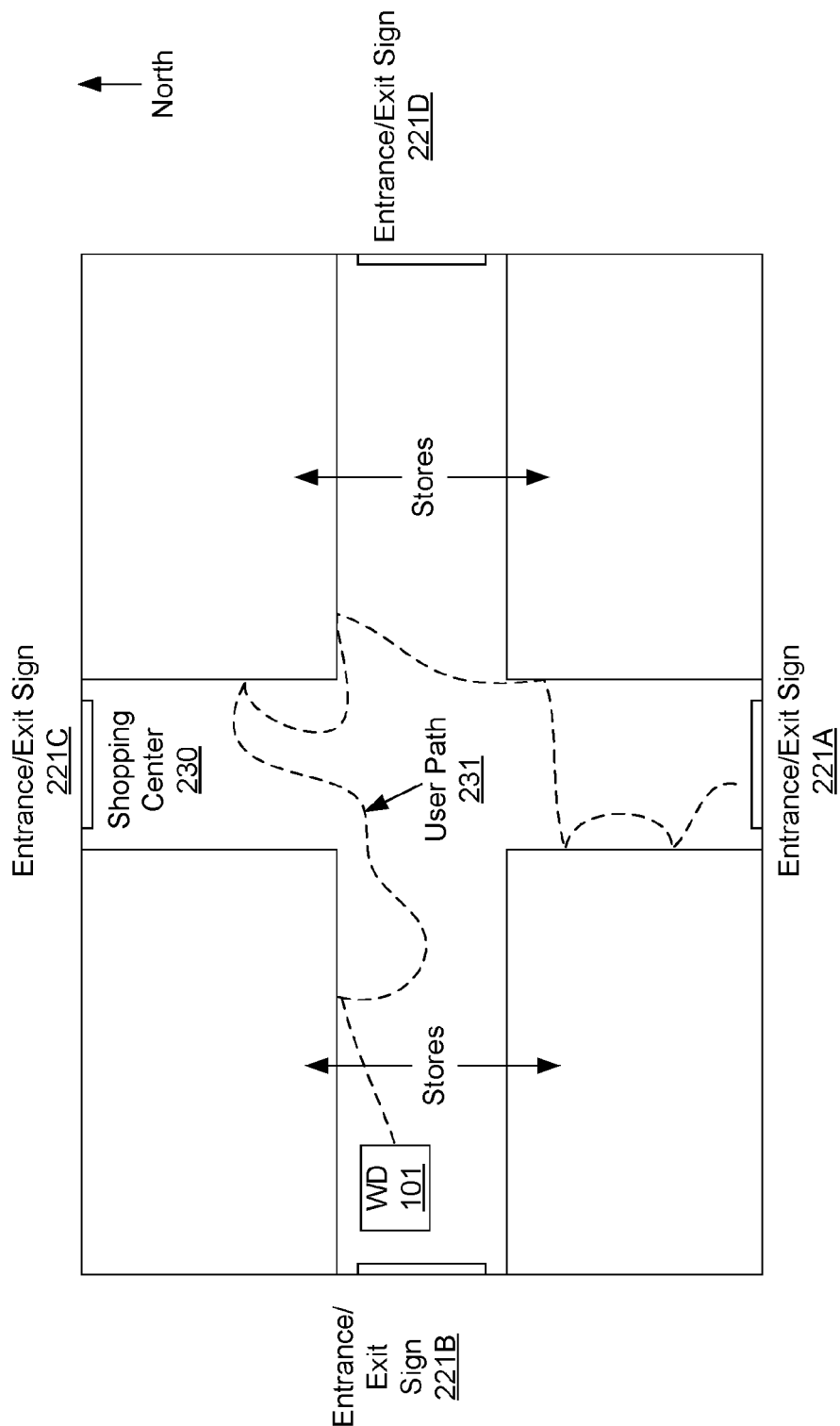
FIG. 2C is a diagram illustrating an exemplary wireless device positioning performed inside a structure based on a user's path inside the structure, in accordance with an embodiment of the invention.

FIG. 2C is a diagram illustrating an exemplary wireless device positioning performed inside a structure based on a user's path inside the structure, in accordance with an embodiment of the invention. Referring to FIG. 2C, there is shown a shopping center 230 with various stores, the wireless device 101, the entrance/exit signs 221A-221D, and a user path 231.

In an exemplary scenario, the wireless device 101 may be operable to determine its position within the shopping center 230 without GNSS. For example, the wireless device 101 may comprise a compass such that it can determine what direction the wireless device 101 is facing and may also comprise a pedometer for determining the distance the user of the wireless device 101 has traveled based on the number of steps taken since the last GNSS position was determined. The wireless device 101 may determine its position by calculating a distance traveled using a pedometer and an altimeter, if necessary (i.e., if the user has travelled to a different level or floor of the shopping center 230), in conjunction with the direction traveled as determined by a compass. The distance from the last known GNSS position may be determined by integrating the steps taken over the direction that the wireless device 101 traveled as determined by a compass, for example.

In another exemplary scenario, the wireless device 101 may be operable to track its position via captured images and/or video. For example, images may be taken periodically such that the wireless device 101 may update its position by calculating its distance from captured images as compared to a textual information database. For example, the user of the wireless device 101 may capture images of signs on store fronts, determine its distance from the store-fronts, and compare the text to a textual information database with known store locations to accurately determine its position.

Figure 2D:
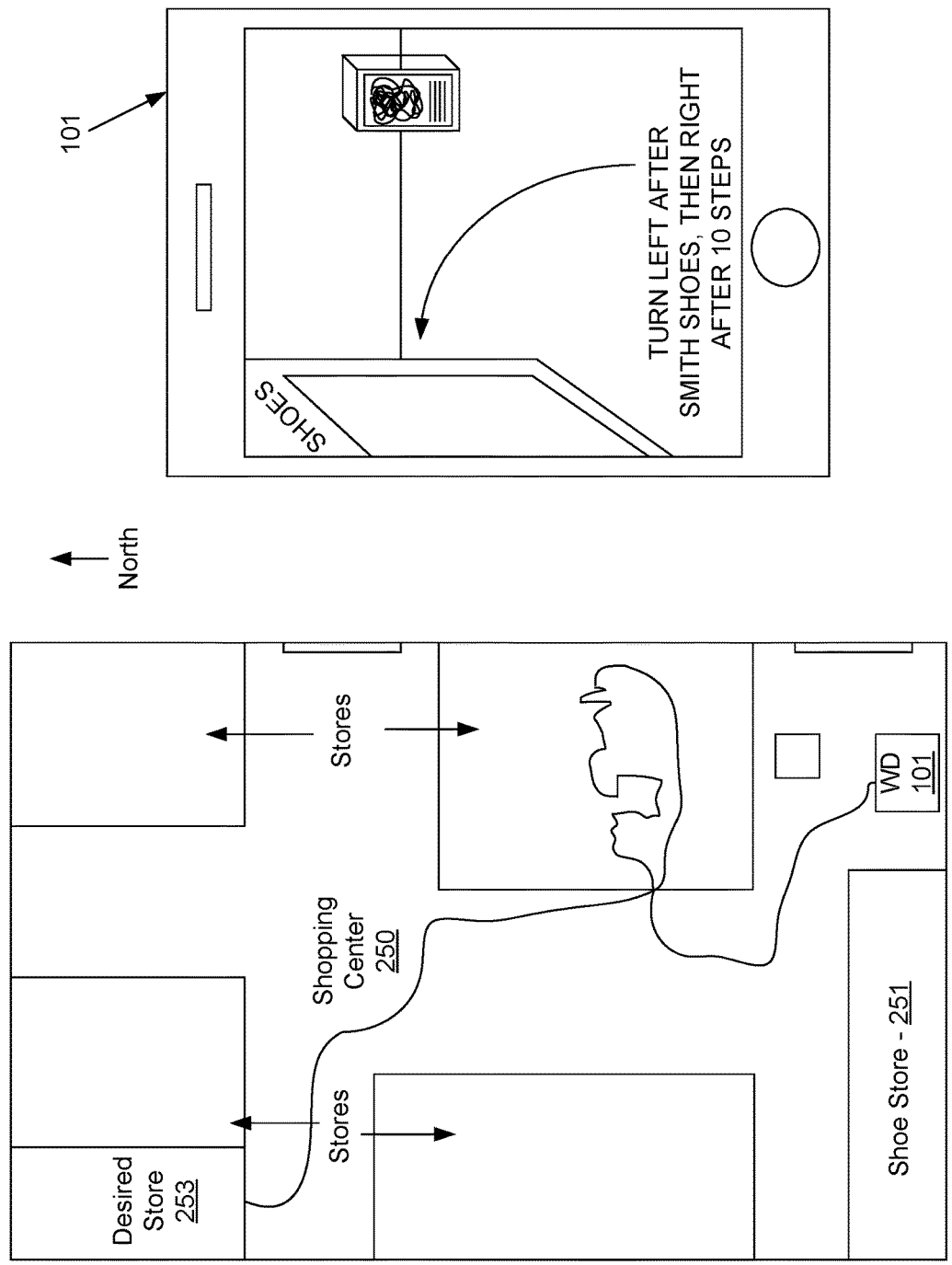
FIG. 2D is a diagram illustrating an exemplary wireless device navigation, in accordance with an embodiment of the invention.

FIG. 2D is a diagram illustrating an exemplary wireless device navigation, in accordance with an embodiment of the invention. Referring to FIG. 2D, there is shown a shopping center 250, the wireless device 101, various stores, a shoe store 251, and a desired store 253.

In an exemplary scenario, the wireless device 101 may be operable to determine its position, and then may be able to navigate the user of the wireless device 101 to a desired location, such as at the desired store 253 from its present position near the shoe store 251, all without GNSS.

The wireless device 101 may determine its initial or present position from an image of the text of a nearby store sign, or any other signage or textual information, such as support column labels, in the vicinity of the wireless device 101 that corresponds to textual information in a stored structural database or map, as discussed above. The user of the device may then enter a desired location or destination, such as the desired store 253, into the wireless device 101 via textual or audio inputs, for example.

The wireless device 101 may also be operable to determine the optimal path to reach the desired store 253, based on the stored map of the shopping center 250, and may display all or part of a map demonstrating the steps to be taken by the user to get to the destination. For example, the wireless device 101 may display a top-view surface map of the shopping center 250, and overlay a path or direction on the map for the user to follow, with instructions and/or arrows for navigation assistance. Alternatively (or additionally), the wireless device 101 may display a superimposed augmented reality, with instructions, arrows, and/or a direction overlaid on an image of the shopping center 250 in the direction in which the user should be facing to reach the desired destination. The wireless device 101 may then, using the compass and pedometer (and altimeter, if necessary), track and display the user's progress along the path to, or in the direction toward, the desired destination.

In addition, the wireless device 101 may utilize textual features from captured images to track the progress of the user toward the desired store 253. For example, text from store front signs may be used for accurate positioning. The updated positioning may enable an updated augmented reality display, such that the displayed image continues to match that of the surroundings when following the appropriate route.

In instances where the wireless device 101 is no longer capable of capturing images, such as by being placed in a pocket, it may continue to track position via a pedometer, compass, and/or an altimeter, such that when the wireless device 101 is again retrieved to check the route, it may still have an accurate calculated position. The wireless device 101 may reestablish its position using a captured image of a sign or other textual information to verify its location with respect to the desired destination.

In another exemplary scenario, the wireless device 101 may incorporate a conversational element to positioning. Accordingly, if the wireless device 101 determines a position but does not have a high accuracy probability, the wireless device 101 may ask the user questions to improve the positioning accuracy. For example, the wireless device may ask the user "Do you see a movie theater to your right?" If the answer does not confirm the estimated position, the wireless device 101 may request that the user capture one or more additional images for positioning purposes. Or the wireless device 101 may request that the user scan to the left or right to determine whether expected textual information is present. The conversational element may also be extended to assist in the navigational aspects of the present invention.

Similarly, if the user of the wireless device 101 makes a stop along the way, as shown in FIG. 2D, the wireless device 101 may again establish a route by determining its position without the use of GNSS, and comparing the determined position to that of the desired store 253 in the stored map. This position may be reestablished by capturing an image of the exited storefront sign or other signs in the vicinity, for example, as described herein. This information can then be used to assist the user, via the map or superimposed augmented reality, back on the previous path or in the proper direction, or on a new path or in a new direction, to the desired destination (i.e., desired store 253).

Figure 3:
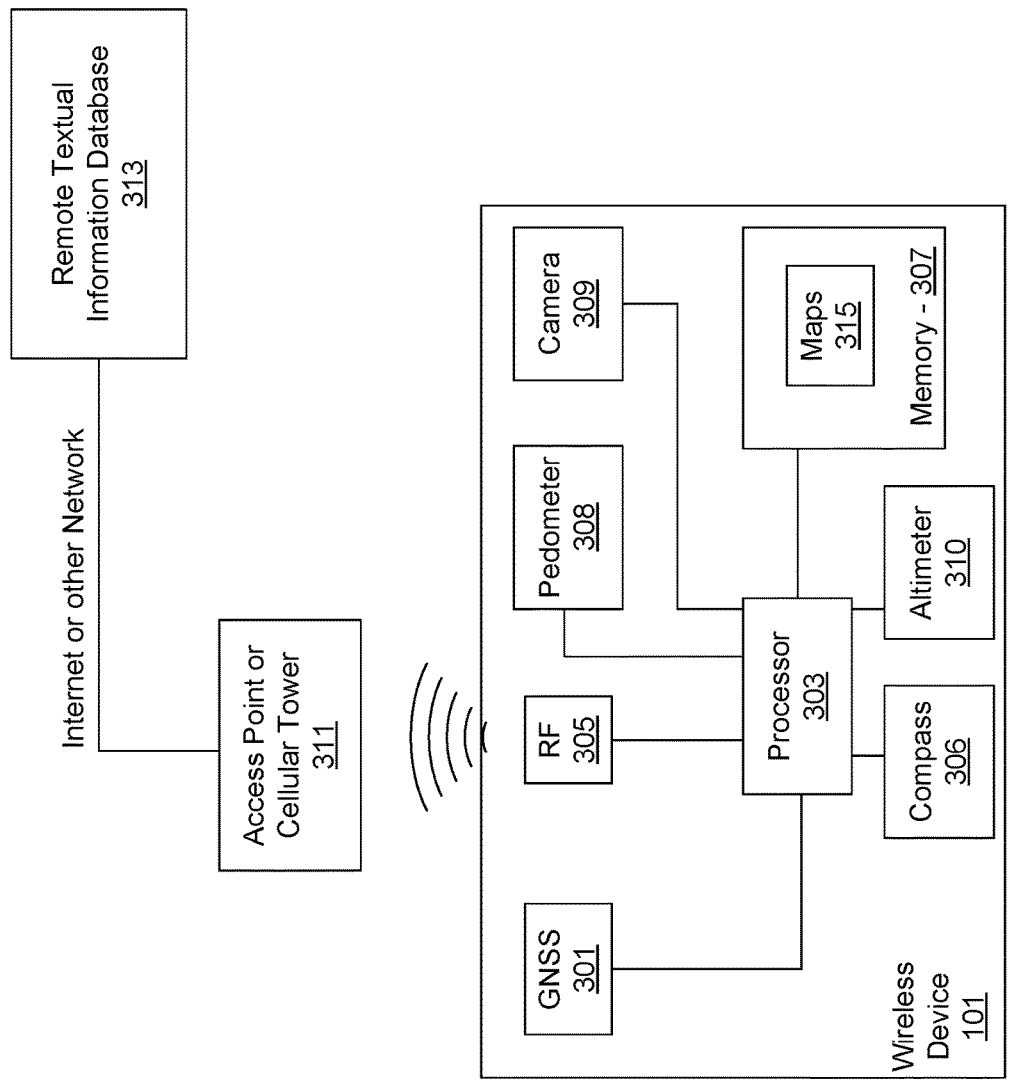
FIG. 3 is a diagram illustrating an exemplary wireless device for positioning, in accordance with an embodiment of the invention.

FIG. 3 is a block diagram illustrating an exemplary positioning wireless device, in accordance with an embodiment of the invention. Referring to FIG. 3, there is shown the wireless device 101 comprising a global navigation satellite system (GNSS) module 301, a processor 303, an RF module 305, a memory 307, and a camera 309. There are also shown the access point or cellular tower 311 and the remote textual information database 313.

The GNSS module 301 may comprise an RF receiver (Rx) path for receiving satellite signals for positioning functions. The GNSS module 301 may be operable to down-convert received RF signals to baseband and subsequently demodulate the baseband signals to obtain an accurate clock signal, such as a GPS clock signal. By receiving clock signals and ephemeris data from multiple satellites, the wireless device 101 may be operable to accurately determine its location.

The RF module 305 may comprise one or more RF Rx and transmit (Tx) paths for communicating with cellular towers or wireless access points, for example. The RF module 305 may comprise one or more antennas, low-noise amplifiers (LNAs), power amplifiers, mixers, local oscillators, variable gain amplifiers, filters, and analog-to-digital converters (ADCs), for example. The RF module may thus be operable to receive RF signals, amplify the signals before down-converting to baseband, filter out noise signals, and convert the resulting filtered signals to digital signals for processing by the processor 303. Similarly, the RF module may be operable to convert digital baseband signals to analog signals, up convert the analog baseband signals to RF, amplify the resulting RF signals and transmit the amplified signals via an antenna.

The memory 307 may comprise a programmable memory module that may be operable to store software and data, for example, for the operation of the wireless device 101. Furthermore, the memory 307 may store downloaded textual information databases that may be utilized by the processor 303 to determine its location without a GNSS signal.

The processor 303 may comprise a general purpose processor, such as a reduced instruction set computing (RISC) processor, for example, that may be operable to control the functions of the wireless device 101. For example, the processor 303 may enable the GNSS module 301 when a user indicates a desire to determine their location. Similarly, the processor may utilize images captured by the camera 309 to determine location when no GNSS signal is present. Accordingly, the processor 303 may be operable to perform optical character recognition (OCR) for extracting textual data from captured images. The processor may correlate a previously determined GNSS location to a stored or downloaded textual information map of a building or other structure that the user of the wireless device 101 has entered.

The camera 309 may be operable to capture still and/or video images via a charge-coupled device (CCD) or complementary metal-oxide semiconductor (CMOS) imaging sensor and associated optical components, such as lenses and readout circuitry. The optical components may comprise one or more lenses with known focal lengths for determining the distance to an object that is in focus, for example.

The camera 309 may be operable to obtain information on text within images including attributes such as position and orientation of the letters in three dimensions, the direction of the text, the absolute size of the letters, the fonts used, the language, dialect or patois in the text, the color and/or lighting of the text, and the presence of bar codes nearby, for example.

The processor 303 and the camera 309 may thus be operable to search for the text in an image using any of the above attributes in combination, and use the perspective on the text (angle/skew/relative size of words/absolute size of the text where available) to determine the location of the wireless device 101.

The access point or cellular tower 311 may be operable to provide wireless connectivity to the wireless device 101 via the RF module 305. The access point or cellular tower 311 may enable access to the remote structural database 313 via the Internet or other network.

The remote textual information database 313 may comprise data relating to textual information found within a building or other location where GNSS signals are not available. For example, the remote textual information database 313 may comprise text of all stores in a shopping center or seating sections of a sports arena with their associated locations. The wireless device 101 may download data from the remote textual information database 313 when entering a building or may download such data at some time prior to entering.

Figure 4:
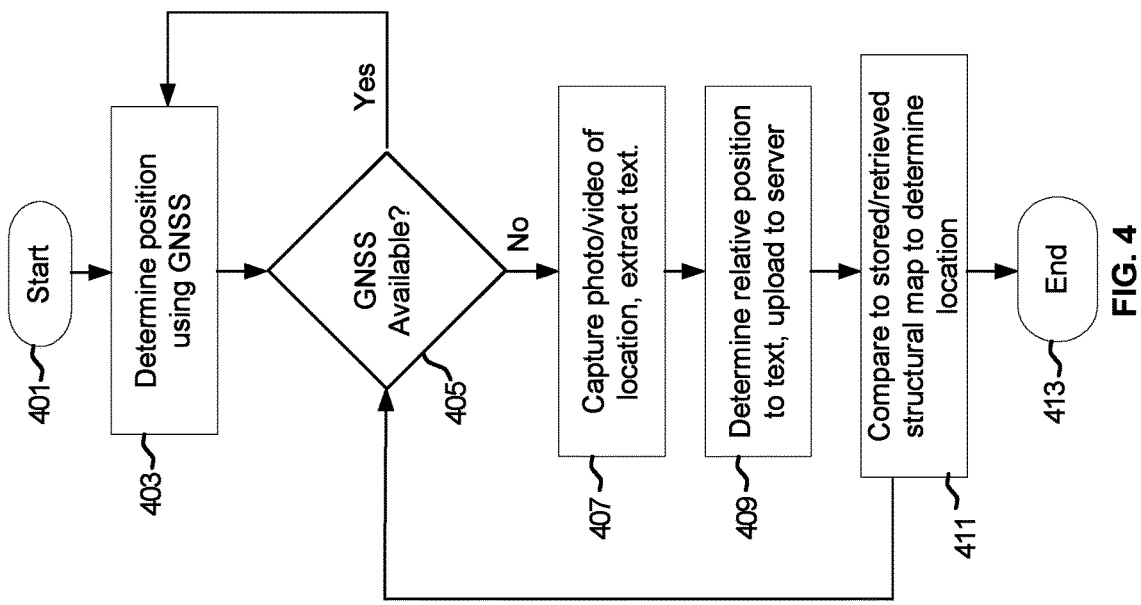
FIG. 4 is a block diagram illustrating exemplary steps in determining location without GNSS, in accordance with an embodiment of the invention.

FIG. 4 is a block diagram illustrating exemplary steps in determining location without GNSS, in accordance with an embodiment of the invention. The exemplary method illustrated in FIG. 4 may, for example, share any or all functional aspects discussed previously with regard to FIGS. 1-3. Referring to FIG. 4, after start step 401, in step 403, the wireless device may determine its location via GNSS (e.g., GPS).

In step 405, if GNSS signals are still available for positioning purposes, the exemplary steps may return to step 403 for continued GNSS positioning. If there are no GNSS signals, such as when the wireless device enters a building or other facility that attenuates GNSS signals below a threshold required for positioning purposes, the exemplary steps may proceed to step 407 where the wireless device may take one or more photo images or videos of the textual features of the surroundings. For example, this may include store signs, seating sections, exit/entrance signs, etc.

The text in the images may be extracted utilizing optical character recognition, for example, and may also capture characteristics of the text such as direction of the text, size, font, color, language, dialect, patois, and for example.

In step 409, the wireless device may determine its distance from the sign or other source of textual information using the known optical characteristics of the camera, for example. The extracted information may be uploaded to a server comprising a textual information database. In another exemplary scenario, the server may download a textual information database to the wireless device.

In step 411, the server, or alternatively the wireless device, may compare the text in the captured images to the stored and/or retrieved textual information database. For example, the wireless device may take an image of a sign of a store that matches that of a store and its location that are stored in a textual information database in the wireless device or on a remote server, which may then calculate an accurate position based on the distance from the sign, as determined by the size of the text and its orientation with respect to the wireless device. The search of the database may be narrowed geographically when the wireless device is known to be in a specific area. For example, if a wireless device is known to be in a certain shopping center, words that correlate to the known stores or businesses in that shopping center would be searched with a higher priority since they would be more likely to be captured by the wireless device.

The optical properties of the camera system in the wireless device may assist in determining an accurate location by determining a distance to imaged text. For example, if the wireless device extracted the text "Sections 220-240" from a sign to a section of a sports arena, the textual information database may comprise a seating map with seating section names/numbers and their position. This information may then be utilized to indicate to the user where they are with respect to their desired seats. Similarly, capturing more than one source of text in an image may provide accurate positioning based on the perspective seen between the difference sources, such as one sign being closer than and at a particular angle from another sign. In another exemplary scenario, UPC bar codes or other bar or 2-dimensional codes may be utilized to determine a position. For example, a wireless device may take an image of or read one or more product UPC bar codes, or bar codes otherwise identifying a specific section, pillar, shelf, etc., in a large store where the locations of the products, sections and shelves are known. It can be determined from the captured image of the code or from a reading of the code that the user is in a certain section of the store (e.g. "tools"). If the user desires to find the section for "plumbing", the user can then enter text or speak into the wireless device (e.g., inputs indicating "plumbing") and be directed along a path toward the plumbing section (with navigation assistance as set forth further herein).

The textual information map may be pre-stored in the wireless device, or may be downloaded at the time of entry into the building. For example, if a calendar in a wireless device indicates that the user will be at a sports event at a particular time, the wireless device may download a seating map with associated seat section names and numbers for the sports arena prior to arrival at the event. In another exemplary scenario, the wireless device may download a textual information map for the nearest structure as determined by the last GNSS determined position when GNSS signals were lost.

The exemplary steps may end at end step 413, or may continue back to step 405 if further positioning is desired.

Figure 5:
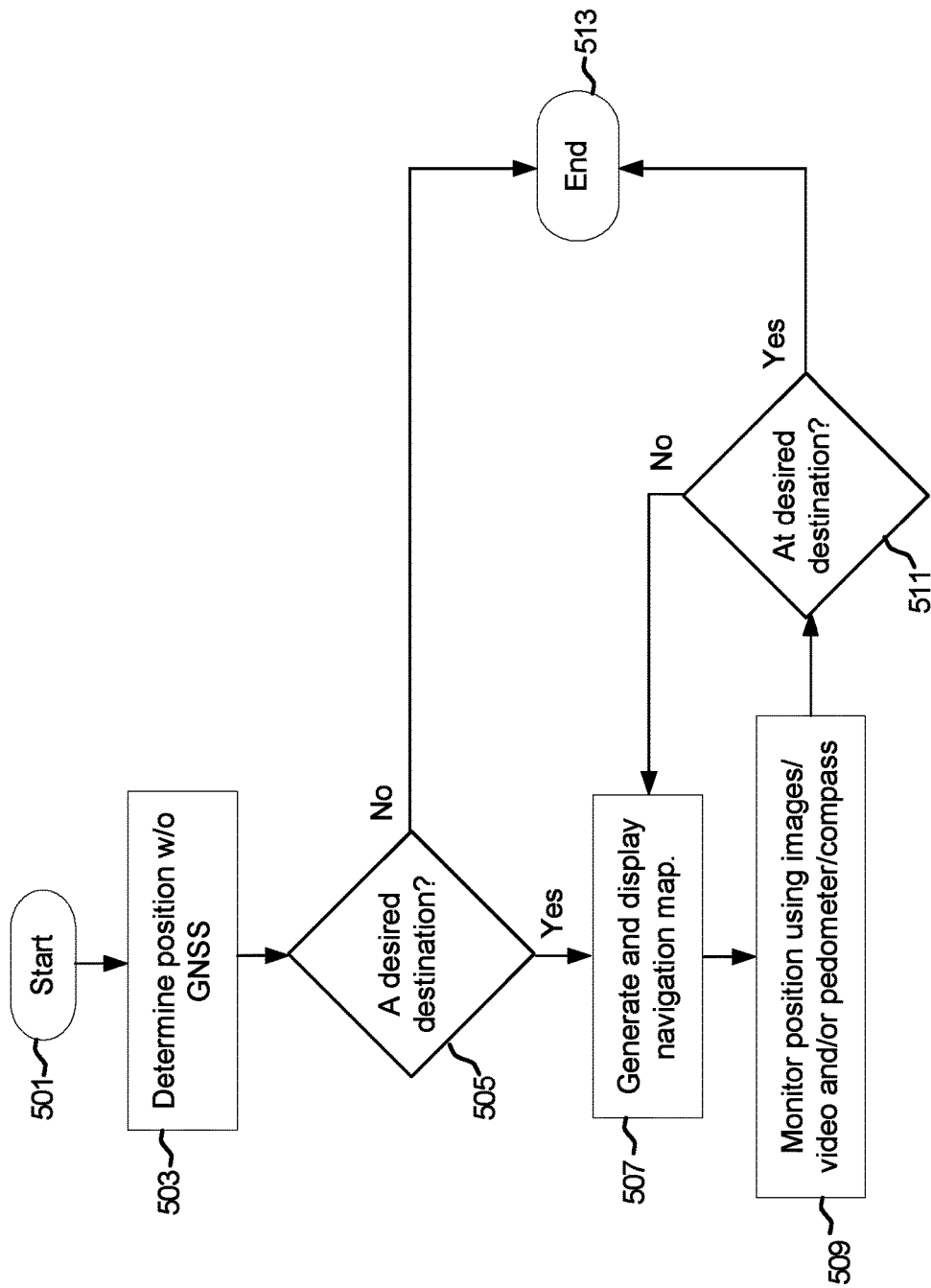
FIG. 5 is a block diagram illustrating exemplary steps for navigation without GNSS, in accordance with an embodiment of the invention.

FIG. 5 is a block diagram illustrating exemplary steps for navigation without GNSS, in accordance with an embodiment of the invention. The exemplary method illustrated in FIG. 5 may, for example, share any or all functional aspects discussed previously with regard to FIGS. 1-4. Referring to FIG. 5, after start step 501, in step 503, the wireless device may determine its location without GNSS, but with knowledge that it is within a particular structure, such as a shopping center or sports arena, for example. The position may be determined by measuring a distance to a sign with textual information whose location is stored in a textual information database. The wireless device may take one or more photo images or videos of the textual features of the surroundings. For example, this may include store signs, entrance/exit signs, billboards, sports arena seating section signs, etc. Knowledge of the optical properties of the camera system in the wireless device may assist in determining an accurate location by determining a distance to imaged text.

In step 505, if the user of the wireless device has entered a desired destination either textually or vocally, the exemplary steps may proceed to step 507, and if there is no desired destination, the exemplary steps may proceed to end step 513.

In step 507, the wireless device may generate and display a navigation map comprising a top-view surface map with a path or direction overlaid thereon, or an augmented reality with a path or direction overlaid on an image of the surroundings in the direction of the desired location.

In step 509, the position of the wireless device may be tracked or monitored utilizing periodically captured images and/or video, and/or by tracking distance utilizing a pedometer in conjunction with a compass (and altimeter, if necessary). In this regard, the wireless device may track and display the user's progress along the path to, or in the direction toward, the desired destination. In step, 511, if the wireless device is at the desired location, the exemplary steps may proceed to end step 513, and if not may continue back to step 507 for further navigation.

Figure 6:
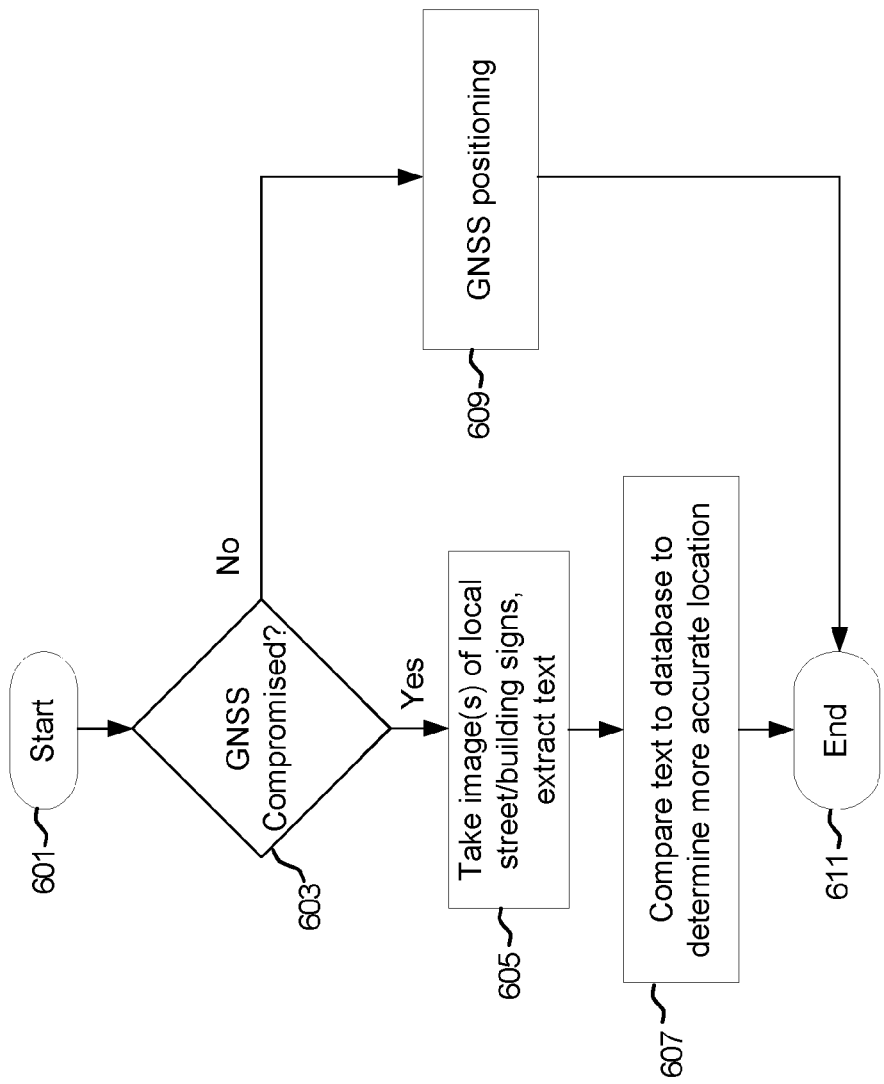
FIG. 6 is a flow diagram illustrating exemplary steps in an enhanced GNSS positioning, in accordance with an embodiment of the invention.

FIG. 6 is a flow diagram illustrating exemplary steps in an enhanced GNSS positioning, in accordance with an embodiment of the invention. The exemplary method illustrated in FIG. 6 may, for example, share any or all functional aspects discussed previously with regard to FIGS. 1-5. Referring to FIG. 6, after start step 601, in step 603, if the GNSS signal is weak or minimal satellites are within the field of view due to the wireless device being surrounded by tall buildings or other attenuating structures, the exemplary steps may proceed to step 605 where the wireless device may take one or more images or video of surrounding sources of textual information. If the GNSS signal is strong, and thus the accuracy of the positioning is high, the exemplary steps may proceed to step 609 for further GNSS positioning followed by end step 611.

In step 607, the text in the captured images or video may be compared to text in a database comprising text associated with known positions to determine a more accurate location. For example, if GNSS has determined that the wireless device is on a particular street with about 100 meter accuracy, the wireless device may take images of one or more street signs or building signs. The text of the signs and their locations may be stored in the database, enabling the wireless device to accurately determine its location, despite the weak GNSS signal, followed by end step 611.

Figure 7:
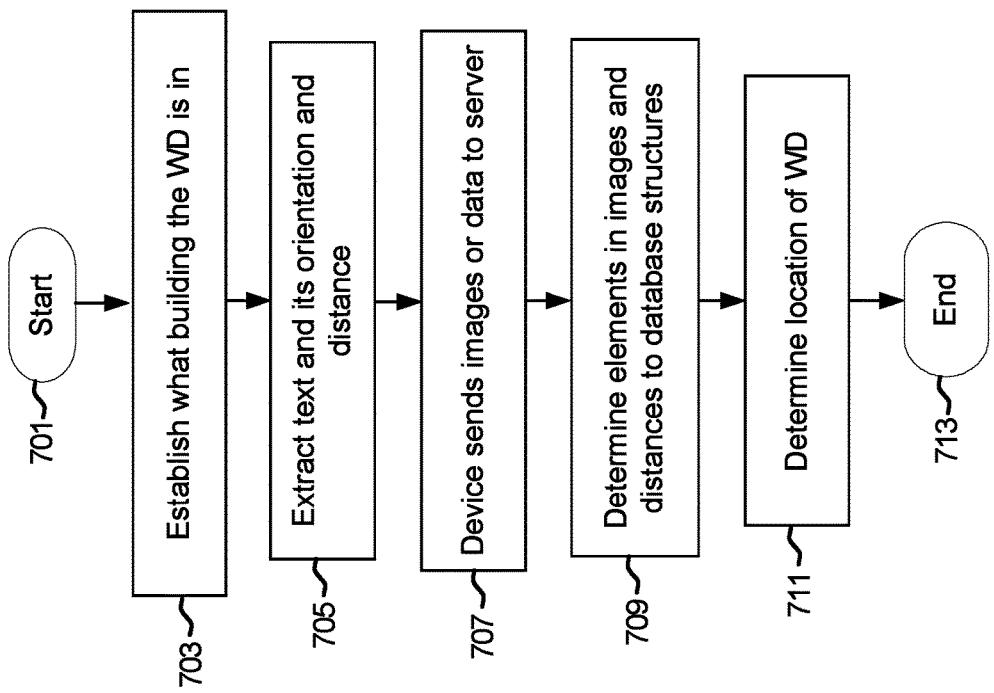
FIG. 7 is a flow diagram illustrating exemplary steps in image textual information extraction, in accordance with an embodiment of the invention.

FIG. 7 is a flow diagram illustrating exemplary steps in image textual information extraction, in accordance with an embodiment of the invention. The exemplary method illustrated in FIG. 7 may, for example, share any or all functional aspects discussed previously with regard to FIGS. 1-6. Referring to FIG. 7, after start step 701, in step 703, the wireless device may determine what building or other attenuating structure that it is within based on its last known position and, if available, velocity and/or elapsed time. In step 705, image processing algorithms, such as optical character recognition (OCR), may be utilized to extract text of captured signs or other sources of text within the building and the wireless device may establish the orientations and distances of the extracted text. The wireless device may also determine its distance from the text source.

In step, 707, the wireless device may communicate images and/or the extracted text, orientations, and distances to a server comprising one or more textual information databases. In another exemplary scenario, the wireless device may upload raw images to the server for the extraction of text and its attributes.

In step 709, the server may search the database for geolocation based on the text and its attributes.

In step 711, based on knowledge of the position of the text found in the database, and the relative position of the camera, the precise position of the camera is determined by the server, or alternatively the wireless device. If the positions of the different text that is captured are known with a varying degree of certainty, estimators such as a Kalman filter can be used to obtain an optimal estimate of the camera location. The exemplary steps may then proceed to end step 713.

Figure 8:
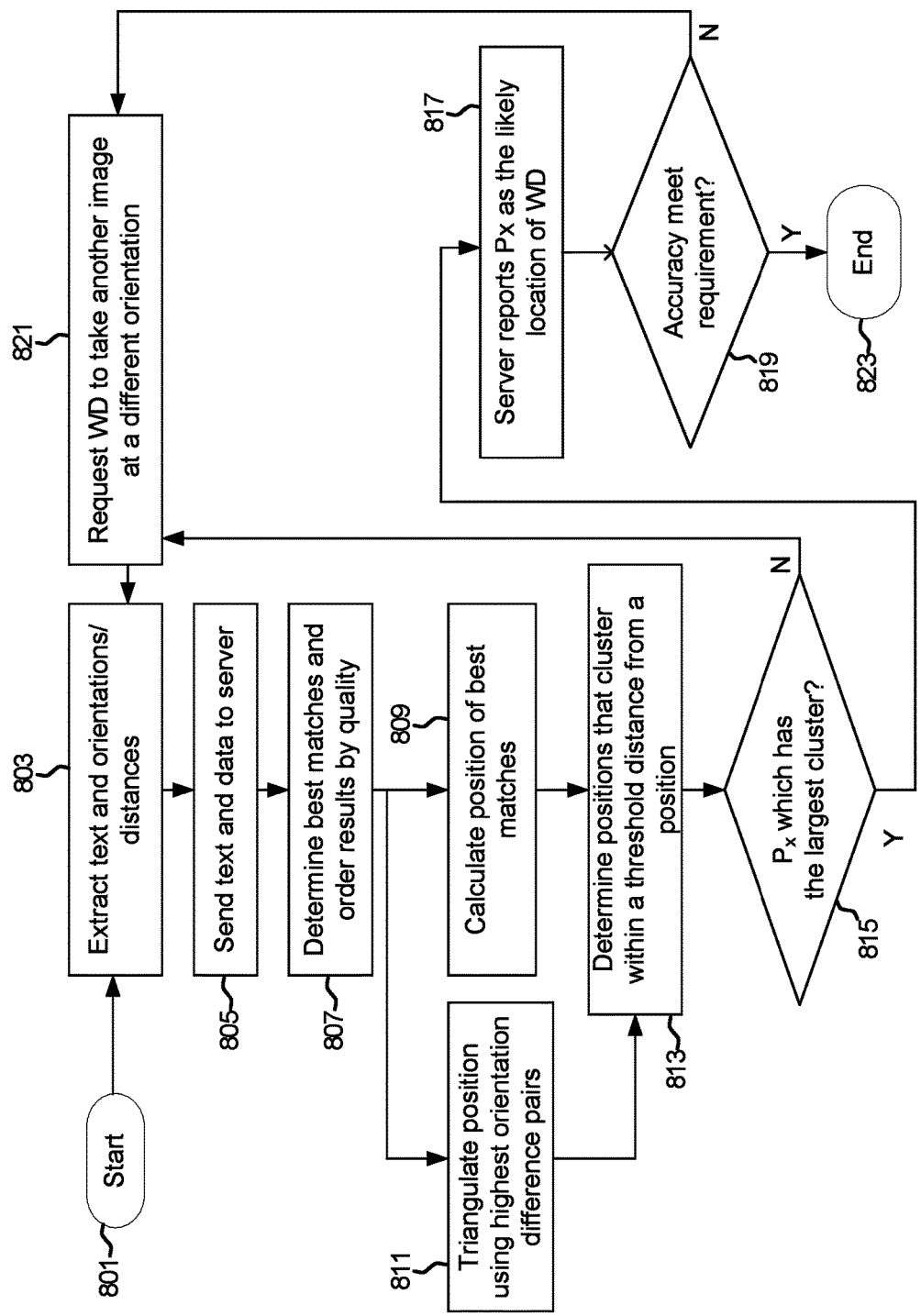
FIG. 8 is a flow diagram illustrating exemplary steps for accurate wireless device positioning, in accordance with an embodiment of the invention.

FIG. 8 is a flow diagram illustrating exemplary steps for accurate wireless device positioning, in accordance with an embodiment of the invention. The exemplary method illustrated in FIG. 7 may, for example, share any or all functional aspects discussed previously with regard to FIGS. 1-8. Referring to FIG. 8, after start step 801, in step 803, image processing algorithms may be utilized to extract textual information from one or more images or videos captured by the wireless device of a sign or other textual information source in a building or other attenuating structure. The wireless device may establish orientations and distances of the text with respect to the wireless device.

In step 805, the wireless device may communicate extracted text, orientations, fonts, size, language, color, and distances of the elements to a server comprising one or more textual information databases. In step 807, the server may determine the best matches between received data and structural elements within its database, and may order the results by the quality, $Q_i$, of the match.

Following step 807, the exemplary steps may include one or both of steps 809 and 811. In step 809, the server may start with the highest quality matches, $M_i$, and use the orientation and distance to the wireless device to determine the estimated position of the wireless device, $P_i$. In step 811, the server may start with the highest quality match pairs, $M_i$ and $M_j$ that have the largest orientation difference, and use them to triangulate the position $P_{ij}$.

In step 813, the server may find the matches $M_j$ that have positions $P_i$ and $P_{ij}$ that cluster most closely around a position $P_x$, using a distance metric weighted by the quality of match and triangulation. In step, 815, if there is a $P_x$ which has the largest cluster, including data from previous iterations, the exemplary steps may proceed to step 817, where the server may report $P_x$ as the likely location of the wireless device. The accuracy may be given by the variance of the positions $P_j$ weighted by the quality of the match and triangulation.

If, in step 815, there is no $P_x$ with a large cluster of results, the exemplary steps may proceed to step 821 where the wireless device may be requested to take one or more images at a different orientation, preferably recommending an orientation with prominent text and large orientation difference, before proceeding to step 803 for a renewed extraction process.

Following step 817, in step 819, if the positioning accuracy meets a user or application requirement, the exemplary steps may proceed to end step 823, and if not, the exemplary steps may proceed to step 821 for further image capture.

FIG. 9 is a diagram illustrating an exemplary wireless device positioning based on text perspective, in accordance with an embodiment of the invention. Referring to FIG. 9, there is shown three different perspectives, FIGS. 9A-9C, of the same text as captured by the wireless device 101. The perspective, or orientation, of the text in conjunction with the knowledge of the text characteristics and location may be utilized to determine an accurate position of the wireless device 101.

For example, in FIG. 9A, the height of the letters of the text as viewed by the wireless device may appear to be the same on the left side as the right side, i.e., the "T"s are of the same height, or are of the same height ratio as expected if looking straight at the text. Similarly, the distance to the two outer letters may be measured to be the same by the wireless device based on focus settings and focal length of the optics in the camera of the wireless device. Accordingly, because the location of the text is stored in the textual information database, the wireless device may then be accurately determine its location, since it is at an accurately measured distance from a known location.

In FIG. 9B, the text characters may be appear to be larger on the left side as compared to the right, indicating that the left side is closer than the right side to the wireless device. In this instance, the wireless device may accurately determine its position from a measurement of the relative heights of the letters and a single measure of the distance to the letters. The observed relative heights of the outer letters, when compared to the actual height ratio as stored in the database may be a measurement of the lateral distance from looking straight on to the sign, as shown in FIG. 9A.

Similarly, the wireless device may determine distances to both the edges of the left and right letters or between the first and last letters, based on focus settings and focal length of the optics in the camera of the wireless device. These distances, along with the known distance between the first and last letters or left and right edges of the text (i.e., the width of the sign) from the textual information database, give the three sides of the triangle formed between the wireless device and the outer letters.

In FIG. 9C, the text characters may appear to be larger on the right side as compared to the left, indicating that the right side is closer than the left side to the wireless device. In this instance, the wireless device may accurately determine its position from a measurement of the relative heights of the letters and a single measurement of the distance to the letters.

Similarly, the wireless device may determine distances to the left and right edges of the letters or between the first and last letters, based on focus settings and focal length of the optics in the camera of the wireless device. These distances, along with the known distance between the first and last letters or left and right edges of the text (i.e., the width of the sign) from the textual information database, give the three sides of the triangle formed between the wireless device and the outer letters.

Figure 10:
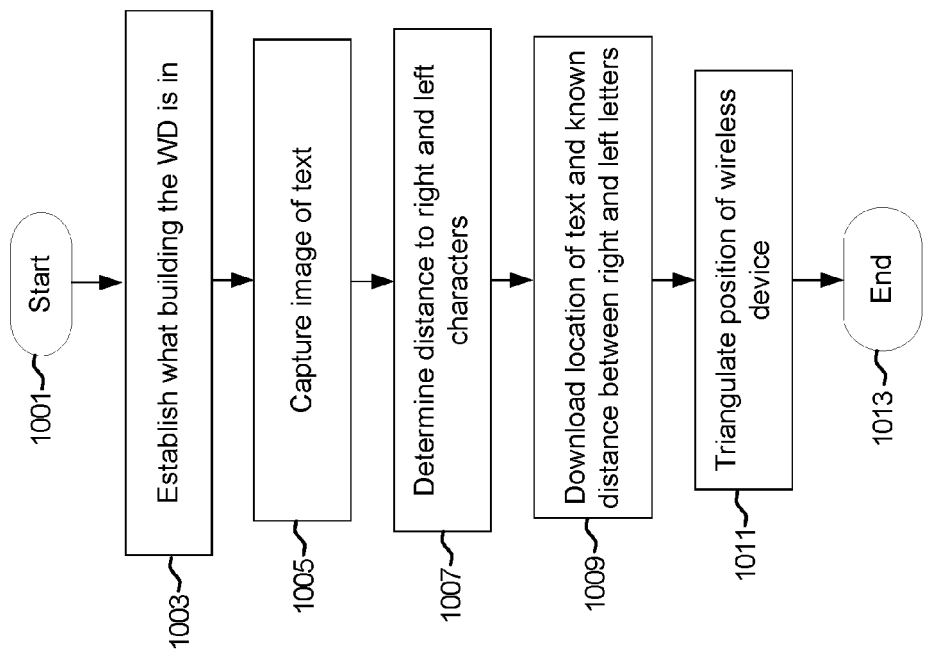
FIG. 10 is a flow diagram illustrating an exemplary distance determination using perspective, in accordance with an embodiment of the invention.
Figure 11:
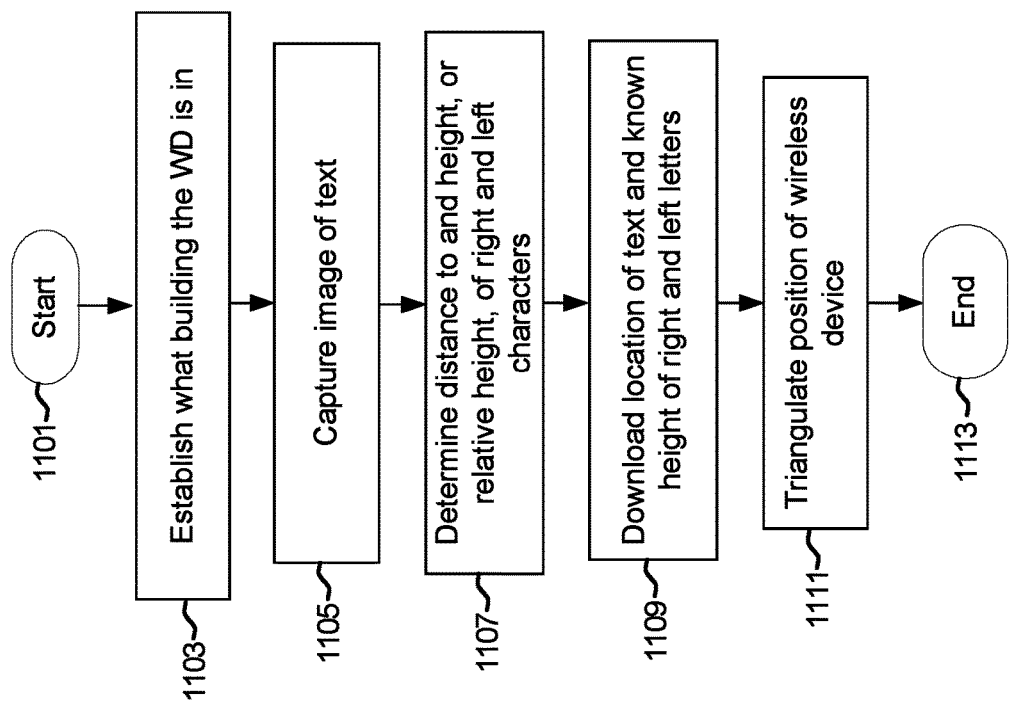
FIG. 11 is a flow diagram illustrating an exemplary distance determination using perspective, in accordance with an embodiment of the invention.

These two distance determination methods provide an accurate positioning capability to the wireless device without the need for GNSS, and are described further with respect to FIGS. 10 and 11.

FIG. 10 is a flow diagram illustrating an exemplary distance determination using perspective, in accordance with an embodiment of the invention. The exemplary method illustrated in FIG. 10 may, for example, share any or all functional aspects discussed previously with regard to FIGS. 1-9. Referring to FIG. 10, after start step 1001, in step 1003, the wireless device may determine what building or other GNSS signal attenuating structure in which it is located, based upon its last known GNSS position, for example. In step 1005, the wireless device may capture images of a source of text, followed by step 1007, where the wireless device may determine the distances to the outer letters of the sign or other source of text. This may be determined using known focus settings and focal lengths of optics in the camera or cameras in the wireless device.

In step 1009, the location of the source of the text and the distance between the outer or inner edges of the outer letters may be downloaded from a textual information database. The database may be stored in a remote server, or may be downloaded to the wireless device when entering the building.

In step 1011, the wireless device may triangulate its position from the three sides of the triangle as defined by the wireless device and the outer letters of the text source, followed by end step 1013.

FIG. 11 is a flow diagram illustrating an exemplary distance determination using perspective, in accordance with an embodiment of the invention. The exemplary method illustrated in FIG. 11 may, for example, share any or all functional aspects discussed previously with regard to FIGS. 1-10. Referring to FIG. 11, after start step 1101, in step 1103, the wireless device may determine what building or other GNSS signal attenuating structure in which it is located, based upon its last known GNSS position, for example. In step 1105, the wireless device may capture images of a source of text, followed by step 1107, where the wireless device may determine a distance to the sign or other source of text and the height, or relative height, of outer letters in the sign. This may be determined using known focus settings and focal lengths of optics in the camera or cameras in the wireless device, although a relative height measurement would have fewer requirements.

In step 1109, the location of the source of the text and the height and/or relative height of the outer letters may be downloaded from a textual information database. The database may be stored in a remote server, or may be downloaded to the wireless device when entering the building.

In step 1111, the wireless device may triangulate its position from the measured distance between the sign and the wireless device in conjunction with the lateral distance as determined by the outer letter height ratio when compared to the actual height ratio, followed by end step 1113.

In an embodiment of the invention, a method and system may comprise capturing one or more images of one or more sources of textual information 201A-201D, 221A-221D in the vicinity of a wireless communication device 101. Text may be extracted from the one or more sources of textual information 201A-201D, 221A-221D and a position of the wireless device 101 may be determined based on a comparison of the extracted text in the captured one or more images to text in a stored database 107, 313 of textual information.

An orientation of the text may be sensed in the captured one or more images relative to the wireless device 101. An orientation of the wireless device 101 may be utilized in conjunction with the extracted text for the position determining. The orientation and the extracted text may be utilized in conjunction with determined distances from the one or more sources of textual information 201A-201D, 221A-221D for the position determining. Locations of the sources of textual information 201A-201D, 221A-221D and/or the captured one or more images may be stored in the database of textual information 107, 313.

An instruction to capture one or more images in a different orientation may be received when the positioning does not meet an accuracy requirement. The database of textual information 107, 313 may be downloaded when GNSS signals sufficient for positioning are no longer received by the wireless communication device 101. A distance from one or more of the sources of textual information 201A-201D, 221A-221D in the vicinity of the wireless communication device 101 may be determined based on known optical properties of a camera 309 in the wireless communication device 101. The optical properties may comprise focal length and/or focus setting. The determined distance may be used to determine an accurate location based on the captured one or more images.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for location determination and navigation using textual information.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless device positioning, the method comprising:
 in a wireless communication device:
  capturing one or more images of one or more sources of textual information in the vicinity of said wireless communication device;
  extracting text from said one or more sources of textual information; and
  determining a position of said wireless communication device by, at least in part, determining a distance to a letter at a beginning of the one or more sources of textual information, determining a distance to a letter at an end of the one or more sources of textual information, and triangulating the position using the determined distances.

2. The method according to claim 1, comprising sensing an orientation of said text in said captured one or more images relative to said wireless device.

3. The method according to claim 1, comprising utilizing an orientation of said wireless device in conjunction with said extracted text for said position determining.

4. The method according to claim 3, comprising utilizing said orientation and said extracted text in conjunction with determined distances from said one or more sources of textual information for said position determining.

5. The method according to claim 1, comprising storing locations of said sources of textual information and/or said captured one or more images in a database of textual information.

6. The method according to claim 1, comprising receiving an instruction to capture one or more images in a different orientation when said positioning does not meet an accuracy requirement.

7. The method according to claim 1, comprising downloading and storing a database of textual information when GNSS signals sufficient for positioning are no longer received by said wireless communication device.

8. The method according to claim 1, comprising determining a distance from one or more of said sources of textual information in the vicinity of said wireless communication device based on known optical properties of a camera in said wireless communication device.

9. The method according to claim 8, wherein said optical properties comprise focal length and/or a focus setting.

10. The method according to claim 8, wherein said determined distance is used to determine an accurate location based on said captured one or more images.

11. The method according to claim 1, wherein the determining a position comprises retrieving from a stored database of textual information, a known distance between or involving the letter at the beginning and the letter at the end of the one or more sources of textual information, and triangulating using the known distance.

12. A system for wireless communication, the system comprising:
 one or more circuits for use in a wireless communication device, said one or more circuits being operable to:
  capture one or more images of one or more sources of textual information in the vicinity of said wireless communication device;
  extract text from said one or more sources of textual information; and
  determine a position of said wireless communication device by, at least in part, determining a distance to a letter at a beginning of the one or more sources of textual information, determining a distance to a letter at an end of the one or more sources of textual information, and triangulating the position using the determined distances.

13. The system according to claim 12, wherein said one or more circuits are operable to sense an orientation of said text in said captured one or more images relative to said wireless device.

14. The system according to claim 12, wherein said one or more circuits are operable to utilize an orientation of said wireless device in conjunction with said extracted text for said position determining.

15. The system according to claim 14, wherein said one or more circuits are operable to utilize said orientation and said extracted text in conjunction with determined distances from said one or more sources of textual information for said position determining.

16. The system according to claim 12, wherein said one or more circuits are operable to store locations of said sources of textual information and/or said captured one or more images in a database of textual information.

17. The system according to claim 12, wherein said one or more circuits are operable to receive an instruction to capture one or more images in a different orientation when said positioning does not meet an accuracy requirement.

18. The system according to claim 12, wherein said one or more circuits are operable to download and store a database of textual information when GNSS signals sufficient for positioning are no longer received by said wireless communication device.

19. The system according to claim 12, wherein said one or more circuits are operable to determine a distance from one or more of said sources of textual information in the vicinity of said wireless communication device based on known optical properties of a camera in said wireless communication device.

20. The system according to claim 19, wherein said optical properties comprise focal length and/or a focus setting.

21. The system according to claim 12, wherein said stored database of textual information comprises a plurality of images of text.

22. The system according to claim 12, wherein said one or more circuits are operable to determine a second position by retrieving from a stored database of textual information, a known distance between or involving the letter at the beginning and the letter at the end of the one or more sources of textual information, and triangulating using the known distance.

23. A system for location determination, the system comprising:
 one or more circuits for use in a wireless communication device, said one or more circuits being operable to:
  receive global positioning satellite (GPS) signals for determining a first position of said wireless communication device;
  capture one or more images of one or more sources of textual information in the vicinity of said wireless communication device;
  extract text from said one or more sources of textual information;
  determine a second position of said wireless communication device by, at least in part, determining a distance to a letter at a beginning of the one or more sources of textual information, determining a distance to a letter at an end of the one or more sources of textual information, and triangulating the second position using the determined distances.

\* \* \* \* \*